(No Model.)
B. R. CODWISE.
GAME BOARD.
No. 340,980. Patented May 4, 1886.
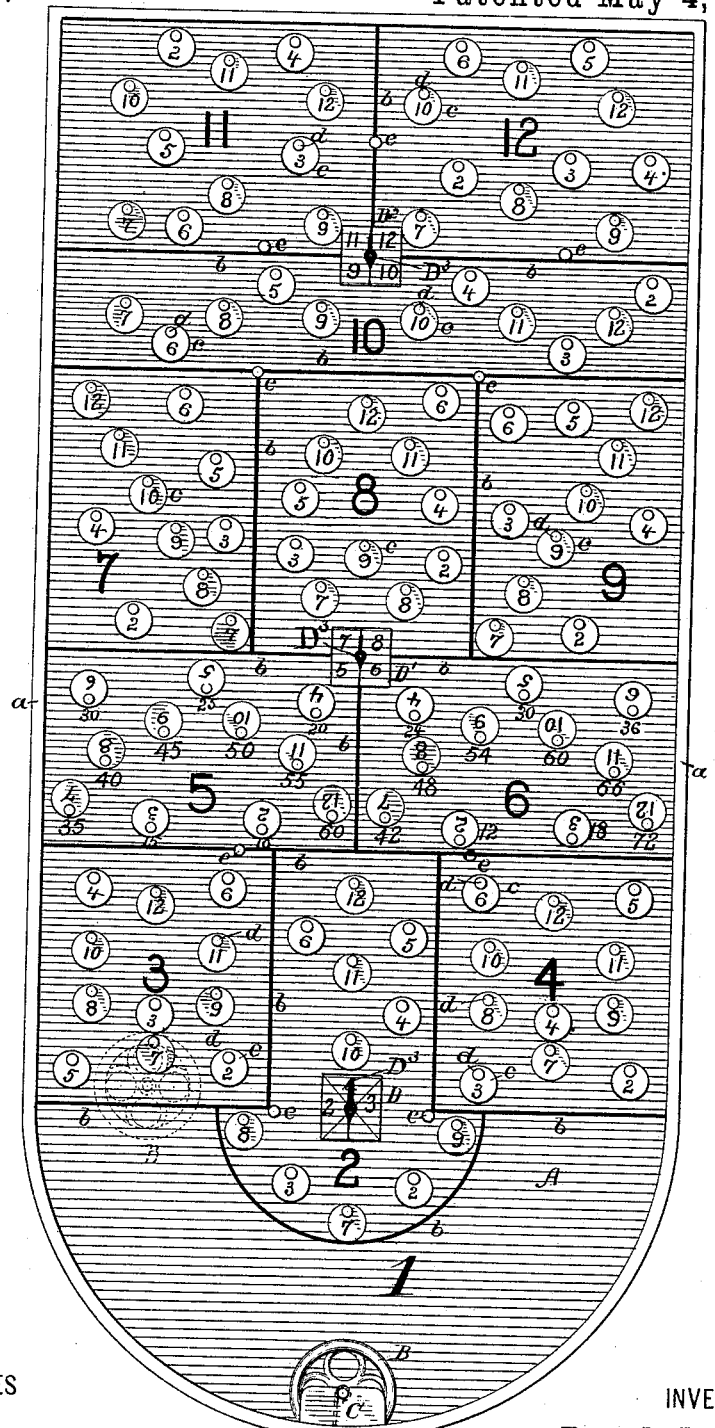
WITNESSES
Ed. A. Newman.
Al. C. Newman.
INVENTOR
Beverly R. Codwise
By his Attorneys
Baldwin, Hopkins & Peyton.

UNITED STATES PATENT OFFICE.

BEVERLY R. CODWISE, OF MONTROSE, MARYLAND.

GAME-BOARD.

SPECIFICATION forming part of Letters Patent No. 340,980, dated May 4, 1886.

Application filed October 28, 1885. Serial No. 181,184. (No model.)

*To all whom it may concern:*

Be it known that I, BEVERLY RANDOLPH CODWISE, of Montrose, Montgomery county, Maryland, have invented a certain new and useful Improvement in Game-Boards, of which the following is a specification.

My invention is designed to amuse young people, to teach them the multiplication-table, and give them a knowledge of addition and subtraction.

The accompanying drawing is a plan view of my improved game-board. The board A is preferably oblong, straight on three sides and curved at its front end, and is surrounded by a flange or fence, $a$. I divide the board by lines $b$ into twelve tables or sections, numbered from 1 to 12, inclusive, corresponding to the twelve divisions of the multiplication-table. In each table, except table No. 1, are arranged a number of disks, $c$—preferably eleven—pivoted eccentrically to the table by means of pins $d$. The disks in each table are numbered on their upper faces from 2 to 12, inclusive. The number of the table is the multiplier and the numbers on the disks are the multiplicands. It is of course not necessary to have any disks or multiplicands in table No. 1, nor to have a disk, No. 1, in any of the tables. Under each disk is marked the result of the multiplication, as shown in tables Nos. 5 and 6, where the eccentric disks are all turned out of their normal positions. Thus in table No. 5 the disk or multiplicand No. 12, multiplied by the number of the table or the multiplier No. 5, gives as a result, 60, which is the number marked on the board at this disk. The same rule applies throughout the several tables. A spinning top, B, spun from a seat, C, at the front end of the board travels over the board, shifting a disk here and there from its normal position, thus exposing the number under the disk and indicating the multiplication. Pins $e$ are arranged here and there on the board for the purpose of varying the course of the top when it strikes them. The top cord, B', passes through an aperture in the flange $a$, and in unwinding the cord the top is pressed into its seat, so that when released it will move forward across the board.

D D' D² indicate forfeit-markers. There are preferably three in number, arranged at equal intervals in the longitudinal center of the board. Each marker has numbers corresponding to some of the tables. Thus D² has numbers corresponding to tables 9, 10, 11, and 12.

D³ are pivoted pointers, free to be moved by the top. When the top has stopped spinning, forfeits are counted against those tables to which the indicators point.

Forfeits for tables Nos. 2, 3, and 4 may be ten each; for 5, 6, 7, and 8, thirty each, and for 9, 10, 11, and 12, fifty each.

To play the game each person selects one or more tables, and a number is selected as a goal—as, for instance, 500 or 1000. Then the top is spun by the players. As the disks are shifted in the several tables the players note the result of the multiplication and call out the numbers. The player for table No. 5 when disk No. 7 is shifted should say "five times seven, thirty-five," and then note it down on paper. A failure to call the numbers as above indicated forfeits the result of the multiplication to the player discovering the omission.

The numbers under the disks may be made to indicate addition, subtraction, or division, as well as multiplication, said numbers being always equal in each case to the sum of the number of the table and the number of the disk, their difference, their quotient, or their product. I prefer, however, to have the numbers indicate multiplication.

I claim as my invention—

1. The herein-described game-board, having a number of eccentrically-pivoted disks that normally cover numbers marked on the board, and are moved by a spinning top to expose the numbers.

2. The herein-described game-board divided into tables, each table containing a number of eccentrically-pivoted disks that normally cover numbers marked on the board, and are moved by a spinning top to expose the numbers.

3. The herein-described game-board divided into a series of numbered tables, each table containing a series of numbered disks that normally cover numbers marked on the board, each of said numbers being equal to the product of the multiplication of the number of the table by the number of its disk.

4. The combination of the board having a series of tables, the pivoted disks, and the forfeit-markers.

5. The combination of the board, the pivoted disks, the top, and the pins for varying the course of the top.

In testimony whereof I have hereunto subscribed my name.

BEVERLY R. CODWISE.

Witnesses:
WM. H. MANOGUE,
LLOYD B. WIGHT.